United States Patent
Pouzet et al.

(10) Patent No.: US 9,546,561 B2
(45) Date of Patent: Jan. 17, 2017

(54) LABYRINTH DISK FOR A TURBOMACHINE

(71) Applicant: SNECMA, Paris (FR)

(72) Inventors: Emilie Pouzet, Fontainebleau (FR); Didier Pasquiet, Boissise le roi (FR); Frederic Lespinasse, Longjumeau (FR)

(73) Assignee: SNECMA, Paris (FR)

(*) Notice: Subject to any disclaimer, the term of this patent is extended or adjusted under 35 U.S.C. 154(b) by 725 days.

(21) Appl. No.: 13/943,943

(22) Filed: Jul. 17, 2013

(65) Prior Publication Data
US 2014/0271150 A1 Sep. 18, 2014

(30) Foreign Application Priority Data
Jul. 18, 2012 (FR) .................................... 12 56924

(51) Int. Cl.
*F01D 11/02* (2006.01)
*F01D 5/08* (2006.01)
*F02C 7/18* (2006.01)

(52) U.S. Cl.
CPC .............. *F01D 11/02* (2013.01); *F01D 5/081* (2013.01); *F02C 7/18* (2013.01); *F05D 2260/941* (2013.01)

(58) Field of Classification Search
CPC ..... F01D 11/005; F01D 11/006; F01D 11/008; F01D 11/02; F01D 5/02; F01D 5/081; F01D 5/082; F01D 5/084; F01D 5/085; F01D 5/087; F05D 2260/941
See application file for complete search history.

(56) References Cited

U.S. PATENT DOCUMENTS

| | | | | | |
|---|---|---|---|---|---|
| 3,768,924 A | * | 10/1973 | Corsmeier | .............. | F01D 5/081 416/220 R |
| 3,832,090 A | * | 8/1974 | Matto | ...................... | F01D 5/081 415/115 |
| 4,236,869 A | * | 12/1980 | Laurello | ................. | F01D 5/081 415/115 |
| 4,435,123 A | * | 3/1984 | Levine | .................... | F01D 11/02 415/115 |
| 4,730,978 A | * | 3/1988 | Baran, Jr. | ............. | F01D 5/3015 415/115 |
| 5,402,636 A | * | 4/1995 | Mize | ........................ | F01D 3/00 415/115 |

(Continued)

FOREIGN PATENT DOCUMENTS

| | | |
|---|---|---|
| EP | 1 571 294 A1 | 9/2005 |
| EP | 2 213 836 A2 | 8/2010 |

OTHER PUBLICATIONS

French Preliminary Search Report issued Jun. 5, 2013 in French 12 56924 filed Jul. 18, 2012 (with English Translation of Category of cited Documents).

*Primary Examiner* — Craig Kim
*Assistant Examiner* — Julian Getachew
(74) *Attorney, Agent, or Firm* — Oblon, McClelland, Maier & Neustadt, L.L.P.

(57) ABSTRACT

A labyrinth disk for a turbomachine is provided. The disk includes a hub, a web and a frustoconical peripheral portion, having on one face labyrinth seal teeth and on the other face radial ribs. The flanks of the ribs delimit, between one another, channels which open out at the periphery of the disk. The width of the channels decreases from the base of the frustoconical portion to the opening at the periphery. The ribs are split close to the periphery, and a recess is created between the two flanks of one and the same rib.

9 Claims, 2 Drawing Sheets

(56) References Cited

U.S. PATENT DOCUMENTS

| | | | | |
|---|---|---|---|---|
| 6,468,032 B2* | 10/2002 | Patel | .................. | F01D 5/081 |
| | | | | 415/115 |
| 6,595,741 B2* | 7/2003 | Briesenick | ................ | F01D 5/08 |
| | | | | 415/116 |
| 7,556,474 B2* | 7/2009 | Marchi | .................. | F01D 5/081 |
| | | | | 415/115 |
| 2005/0249590 A1 | 11/2005 | Marchi | | |
| 2010/0196167 A1 | 8/2010 | Ammann | | |

* cited by examiner

LABYRINTH DISK FOR A TURBOMACHINE

BACKGROUND OF THE INVENTION

The present invention relates to the field of turbomachines, in particular that of gas turbine engines, and specifically to the turbine of such an engine.

DESCRIPTION OF THE PRIOR ART

In a gas turbine engine, the combustion gases from the combustor are expanded in a plurality of successive turbine stages, wherein each stage is made up of a stator ring consisting of distributors which guide the flow received from upstream toward the blades of the rotating disk located downstream. The turbine blades comprise a root and an airfoil and are mounted radially with their root being located in the slots machined into the rim of a rotor disk. The HP turbine disk, for its part, comprises a hub with a central hole and a web, thinner than the hub, which connects the hub to the rim.

In high performance axial turbine engines, such as engines for military applications, the blades of the high pressure (HP) turbine rotor, which are located immediately at the outlet of the combustor, are exposed to a high temperature gas flow. A circuit of air taken from upstream of the combustor provides the necessary cooling for protecting those parts of the turbine which are most exposed to these gases. This circuit generally comprises a means for guiding the air as far as the blade roots; the air then circulates from the blade root through channels created inside the airfoil before being ejected into the gas stream.

The invention relates to a means for guiding the ventilation air formed by a disk generally termed a labyrinth disk. Such a disk is attached to the upstream face of the turbine rotor disk and creates a space for guiding, in the radial direction, the air from an inlet close to the axis of rotation of the rotor to the rim of the turbine disk where the air is introduced into the blade cooling circuit. This disk comprises on its outside face, facing away from that face which creates the air guiding space, a plurality of teeth forming the rotatary element of a labyrinth seal.

The invention relates more particularly to a labyrinth disk comprising at the periphery a frustoconical portion the free edge of which is arranged to as to adapt to the contours of the rim and to press against the turbine disk to which it is attached. Radial ribs are created on the inner face of this frustoconical portion. A cover delimits, along with the inner face of the labyrinth disk and the radial ribs, radial channels for guiding the ventilation air. These channels open into the slots of the rim. The cross section of the channels becomes smaller toward the edge of the labyrinth disk, such that the width of the ribs changes between the lower part of the frustoconical portion and the edge of the labyrinth disk. This width increases toward the edge whereas the height of the ribs remains constant with respect to the inner face of the labyrinth disk. The channels become narrower in order to obey a law governing the variation in cross sections, and thus allow for better compression of the air. It is also noted that the connection surfaces with the inner face of the disk are radiused at the base of the longitudinal flanks of the ribs. In mechanical terms, radiusing refers to the rounded shape of the connection surfaces. In transverse section, the curve of the connector is rounded, for example in an arc of a circle, with a sufficient radius of curvature to avoid, when the engine is running, a concentration of mechanical stresses in this region.

However, a high level of stress close to the periphery of the labyrinth disk has been observed in these radiused regions. This high level is caused by the forces to which the labyrinth disk is subjected in this edge region. Because it is pressed against the turbine disk, the labyrinth disk is subjected to the tangential forces of the turbine disk; these forces are therefore high when the rotational speed is high.

These regions prove critical to estimating the life of the labyrinth disk.

The applicant has set itself the object of finding an optimal profile which reduces the stress levels in this region.

One possible solution consists in increasing the radius of curvature of the connection surfaces in this region. However, this would involve changing the cross sections of the channels and the ventilation flow rate. This is not acceptable from a thermal point of view if the other engine parameters are not changed accordingly.

Another possible solution consists in reconfiguring the entire channel region while maintaining the same ventilation cross section. While this solution is acceptable from the thermal point of view, it means that the entire geometry of the region has to be re-thought. Implementing this solution would incur considerable modification costs. Furthermore, this solution would not allow existing parts to be refurbished.

SUMMARY OF THE INVENTION

The present invention achieves the abovementioned objective. It relates to a labyrinth disk for a turbomachine comprising a hub, a web and a frustoconical peripheral portion, having on the outer face labyrinth seal teeth and on the other—inner—face radial ribs which delimit channels which open out at the periphery of the disk, the width of said channels decreasing from the base of the frustoconical portion to their opening at the periphery. The labyrinth disk is noteworthy in that the ribs are split close to the periphery, a recess being created between the two flanks of one and the same rib.

This recess is enough to reduce the level of stress, since a portion of the shear stress flow is taken up by the recess.

The simplicity of the solution permits low-cost implementation. Moreover, it has no impact on the surroundings of the part as it involves no change in the operation of the engine and requires no special configuration.

Finally, the solution makes it possible to refurbish existing parts.

In accordance with another feature, the recesses open out at the periphery of the disk and comprise flanks the base of which is radiused in shape. More particularly, the radii of curvature of the radiused flanks on the recess side and of the radiused flanks on the ventilation channel side are different. In particular, the radius of curvature Re of the radiused flanks—that is to say of the connection region at the base of the flanks—of the ribs on the recess side is greater than the radius of curvature Rv of the radiused flanks—that is to say of the connection region at the base of the flanks—of the ribs on the channel side.

In accordance with another feature, the height of the flanks of the recesses with respect to the bottom of said recesses is substantially the same as that of the flanks of the ribs. As the position of the bottom of the recess determines the portion of the stress flow which is taken up at this point, said height allows for optimal stress reduction.

In accordance with another feature, the width of the split ribs at the periphery is the same as the width of the ribs at the base of the frustoconical portion.

The invention also relates to a turbine rotor comprising a disk and blades mounted on the rim of the disk, wherein a labyrinth disk according to the invention is mounted on the disk and creates blade ventilation channels.

In accordance with another feature, the labyrinth disk comprises a cover which creates said ventilation channels. More particularly, the rotor comprises an upstream flange for axially locking the blades, wherein the labyrinth disk is in abutment against the radially inward edge of the upstream flange.

BRIEF DESCRIPTION OF THE DRAWINGS

The invention will be better understood and other objectives and details, features and advantages thereof will become more clearly apparent in light of the following detailed explanatory description of an embodiment of the invention—given as an entirely illustrative and nonlimiting example—with reference to the appended schematic drawings, in which.

DESCRIPTION OF THE PREFERRED EMBODIMENTS

Figure 1:
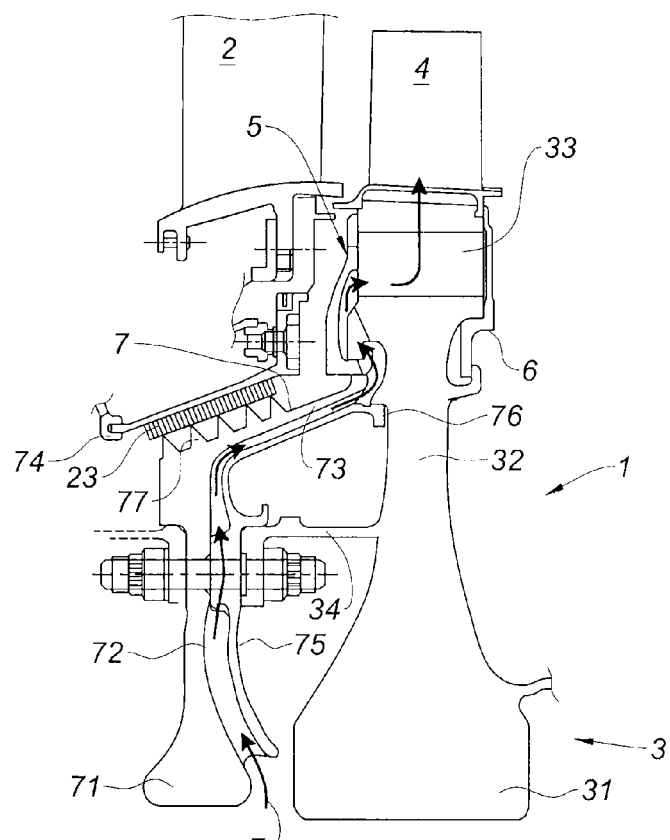
FIG. 1 shows, in an axial half-section view, part of an HP turbine rotor arranged downstream of the combustor of a gas turbine engine.
Figure 2:
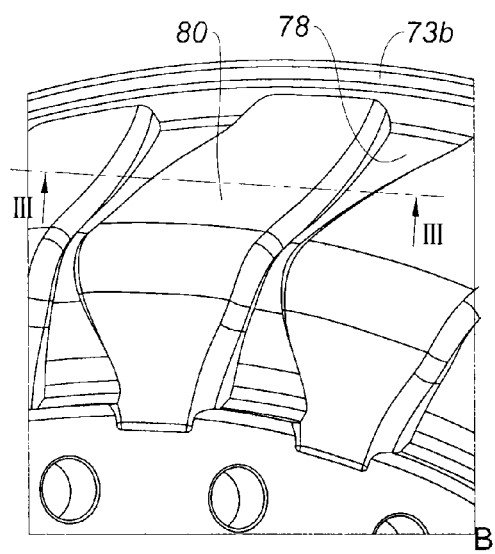
FIG. 2 shows, in perspective, the interior of the prior art labyrinth disk.
Figure 3:
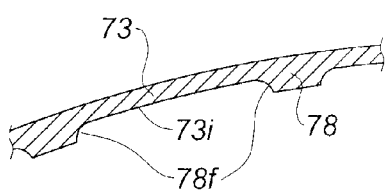
FIG. 3 is a view in section along III-III of the disk in FIG. 2.
Figure 4:
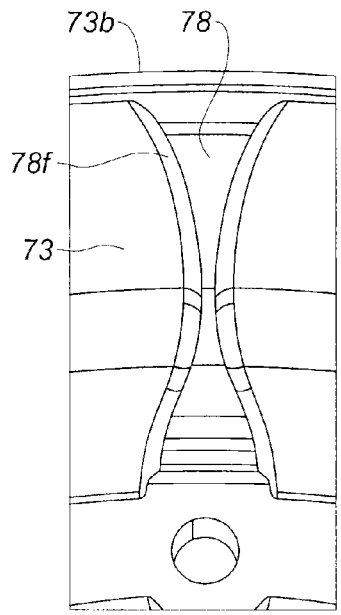
FIG. 4 is a front view of a rib of the disk of FIG. 2, close to the edge.
Figure 5:
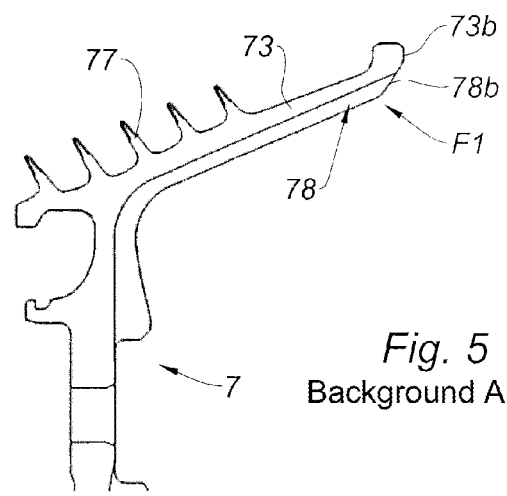
FIG. 5 is a view in section in a plane passing through the axis of the frustoconical portion of the disk in FIG. 2.

FIG. 1 shows a rotor 1 for an axial turbine of a gas turbine engine arranged downstream of the stator ring 2 located at the exit from the combustor (not shown). The rotor 1 comprises a turbine disk 3 composed of a hub 31, a web 32 and a rim 33. The blades 4 are attached to the disk by means of their blade roots which are accommodated in the slots machined in the rim 33. The airfoils of the blades are swept by the hot gases exiting from the distributor 2 and are provided with an internal cooling circuit (not visible in the figure). An upstream flange 5 and a downstream flange 6 ensure both that the blades are prevented from moving axially in their slots and that the setup is airtight with respect to the ventilation air which is introduced at the base of the slots.

A labyrinth disk 7 is mounted on the upstream face of the turbine disk 3 and is fastened to the disk by means of a bolted connection to a flange 34 which is securely attached to the web 32.

The labyrinth disk comprises a hub 71, a web 72 which is thinner than the hub and a frustoconical peripheral part 73 which widens in the downstream direction. The portion 73 presses, by its edge 74 of greater diameter, against the disk 3. This edge comprises in this case a radial abutment surface which presses against the radially inner cylindrical surface of the upstream flange 5. This pressing means that the flange 5 is wedged in position against a shoulder of the disk 3.

The labyrinth disk also comprises a cover 75 on its inner face, that is to say that face which faces the disk. The cover delimits a space, with the inner face of the disk, within which the air for ventilating the blades of the turbine circulates. The circulation is represented by the succession of arrows F proceeding from the root of the labyrinth disk to the slots of the turbine disk.

The edge of greater diameter of the cover 75 is pressed against the turbine disk 3 by means of an abutment surface 76. The abutment surface 76 of the cover presses radially against a shoulder of the web 32 of the turbine disk. The ventilation air is introduced into the slots of the turbine disk via the space created between the two contact areas of the abutment surfaces 74 and 76.

The labyrinth disk 7 has, on its outer face, radial teeth 77 which engage with abradable elements 23 which are securely fastened to the engine casing. These elements together form a labyrinth seal which is known per se.

FIGS. 2 to 5 show the ribs 78 on the inner face, that is to say that face which faces the turbine disk, of the prior art labyrinth disk 7 without the cover 75. The ribs 78 extend radially. In the peripheral portion 73, the ribs widen from the base of this section 73 to the edge of greater diameter 73$b$. The face 78$b$ along this edge is inclined with respect to the axis. At the base of the flanks 78$f$ of the ribs 78, in the region of connection with the inner face 73$i$ of the peripheral portion 73, is a rounded "radiused" surface. The radius of curvature is chosen so as to avoid stress concentrations in this region.

In spite of this precaution, this region 78$f$ close to the edge of greater diameter 73$b$ exhibits high stresses with respect to the other regions of the part.

Figure 6:
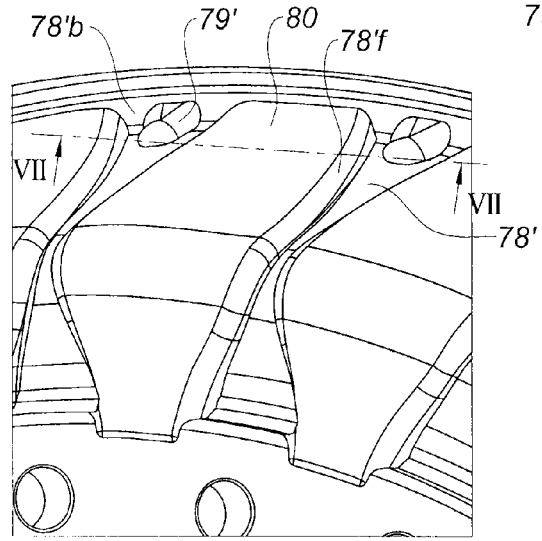
FIG. 6 is a perspective view of the labyrinth disk according to the invention.
Figure 7:
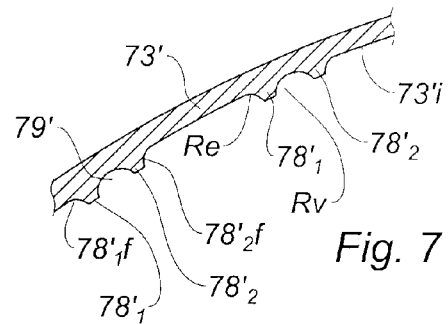
FIG. 7 is a view in section along VII-VII of the disk in FIG. 6.
Figure 8:
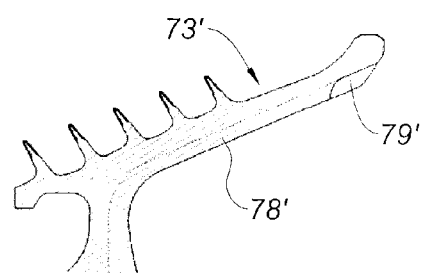
FIG. 8 is a view in section in a plane passing through the axis of the frustoconical portion of the disk in FIG. 6.
Figure 9:
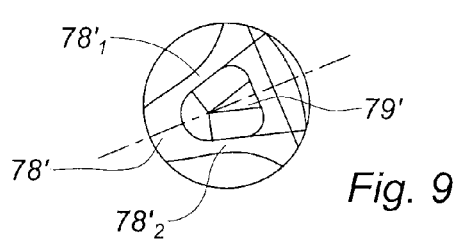
FIG. 9 is a front view of the recess made on the ribs of the disk in FIG. 6.

In order to solve this problem, the invention proposes creating a recess 79 in the ribs 78 close to the free edge 73$b$ of the peripheral portion 73. FIGS. 6 to 9 show the realization of the invention. The modified peripheral portion is labeled 73' and the ribs 78'. The recess 79' of the ribs 78' is realized by subtractive methods. It is open on the end face 78'$b$ and thus splits the rib 78' into two ribs 78'$_1$ and 78'$_2$. The flanks 78'$_1f$ and 78'$_2f$ of these split ribs on the side of the ventilation channels 80 are unchanged with respect to the prior art; they extend from the flanks of the unmodified portion of the rib. The flanks of these split ribs 78'$_1$ and 78'$_2$ as seen from the recess are also rounded. The radius of curvature Re of the connection region that the base of the flanks of the ribs 78'$_1$ and 78'$_2$ makes with the recess is greater than that Rv of the connection region that the base of the flanks of the ribs makes with the inner face 73'$i$ on the channel side, as shown in particular in FIG. 8. The width of the split ribs is preferably the same as the width of the rib on the smaller diameter side of the peripheral portion 73'. The flank of the recess 79', opposite the peripheral edge face 78'$b$ of the rib 78', is also rounded, as shown in FIG. 9. It is rounded both in cross section and along the face of the rib. The radius of curvature is in this case the same as that Rv of the side flanks. The bottom of the recess 79' is at the same level as the inner face 73'$i$ of the peripheral portion, as shown in FIGS. 6, 7 and 8.

It is clear that, in order to implement the invention on a prior art labyrinth disk, it is sufficient to machine a recess in the width of the ribs close to their edge of greater diameter.

By means of the solution of the invention, the life of this part is increased substantially by reducing the maximum stress levels to which it is subjected during operation.

The invention claimed is:

1. A labyrinth disk for a turbomachine comprising:
 a hub;
 a web; and
 a frustoconical peripheral portion, the frustoconical peripheral portion including labyrinth seal teeth on an outer face and radial ribs distributed circumferentially on an inner face,
 wherein flanks of the ribs delimit, between one another, channels which open out at a downstream periphery of the disk at a downstream end of the frustoconical portion, a width of said channels decreasing from a base at an upstream end of the frustoconical portion to an opening at the downstream periphery of the disk,
 wherein a recess is created between two flanks of one of the ribs at the downstream periphery of the disk, the recess opening out at the downstream periphery of the disk.

2. The labyrinth disk as claimed in claim 1, bases of the flanks are radiused in shape.

3. The labyrinth disk for a turbomachine as claimed in claim 2, wherein a radius of curvature of the base of the flank on a recess side is different from a radius of curvature of the base of the flank on a channel side.

4. The labyrinth disk as claimed in claim 1, wherein a height of the flanks on a recess side with respect to a bottom of said recess is the same as a height of the flanks on a ventilation channel side with respect to the bottom of said recess.

5. The labyrinth disk as claimed in claim 1, wherein a width of the rib including the recess at the downstream periphery of the disk is the same as a width of one of the ribs at the base at the upstream end of the frustoconical portion.

6. A turbine rotor comprising a turbine disk and blades mounted on a rim of the turbine disk, wherein a labyrinth disk as claimed in claim 1 is mounted on the turbine disk and creates blade ventilation channels.

7. The rotor as claimed in claim 6, wherein the labyrinth disk comprises a cover which creates said ventilation channels.

8. The rotor as claimed in claim 6, comprising an upstream flange for axially locking the blades, wherein the labyrinth disk is wedged against a radially inward edge of the upstream flange.

9. A gas turbine engine comprising a turbine rotor as claimed in claim 6.

* * * * *